United States Patent [19]

Resag et al.

[11] Patent Number: 4,530,541
[45] Date of Patent: Jul. 23, 1985

[54] BACK REST FOR VEHICLE SEATS

[75] Inventors: Jörg Resag, Filderstadt; Gerhard Schmale, Hückeswagen, both of Fed. Rep. of Germany

[73] Assignee: Keiper Recaro GmbH & Co., Fed. Rep. of Germany

[21] Appl. No.: 505,420

[22] Filed: Jun. 16, 1983

[30] Foreign Application Priority Data

Jun. 16, 1982 [DE] Fed. Rep. of Germany ....... 3222505

[51] Int. Cl.³ .............................................. A47C 7/02
[52] U.S. Cl. .................................................... 297/452
[58] Field of Search .............. 297/452, 450, 391, 410

[56] References Cited
U.S. PATENT DOCUMENTS 3,043,624 7/1962 Mason ................................. 297/452
3,134,627 5/1964 Mason ................................. 297/452

FOREIGN PATENT DOCUMENTS 1794574  4/1959  Fed. Rep. of Germany.
1975071 12/1967  Fed. Rep. of Germany.
1954848  6/1971  Fed. Rep. of Germany.
7327252 11/1973  Fed. Rep. of Germany.

Primary Examiner—Philip C. Kannan
Attorney, Agent, or Firm—Wigman & Cohen

[57] ABSTRACT

In a back rest for a vehicle seat, particularly motor vehicle seats, an upholstery support includes side beams (1,2) and a yoke portion which extends from one side beam to the other in the vicinity of the upper ends of the side beams (1,2). The yoke portion is formed as a bending and kinking resistant spacer (3) which abuts the side beams (1,2) but is not connected thereto and extends rearwardly beyond the side beams (1,2) at least in the area of its end sections which abut the side beams (1,2). A lateral element (7) which engages the side beams (1,2) from behind is attached to the outwardly facing sides of both side beams (1,2) and the back side of the spacer (3) abuts the lateral element (7).

12 Claims, 6 Drawing Figures

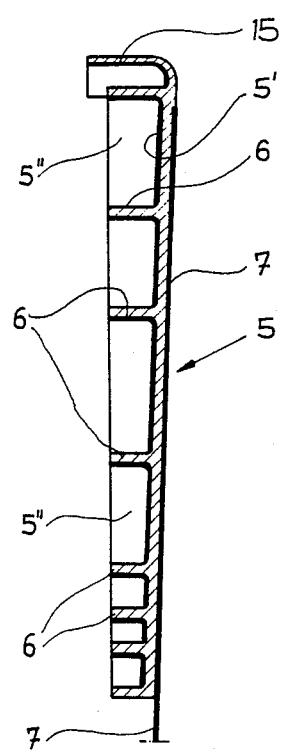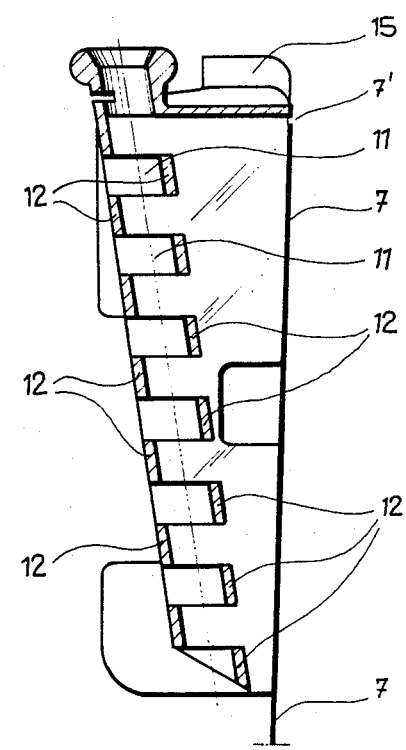

4,530,541

BACK REST FOR VEHICLE SEATS

BACKGROUND OF THE INVENTION

1. Field of the Invention

The invention relates to a back rest for vehicle seats, particularly motor vehicle seats.

2. Description of the Prior Art

In the known back rests of this type, the yoke portion, like the side beams, consists of steel sheet and is welded to the side beams. The rigid connection produced thereby between the ends of the yoke portion and the upper ends of the two side beams has the result that, in a flexing of the yoke portion as a result of a strong load acting in the longitudinal direction of the seat, the side beams experience a twisting distortion, which can substantially reduce their load-carrying capacity in the pivot direction of the back rest.

Since such a decrease in the load-carrying capacity of the side beams must be avoided as far as possible for safety reasons, it has already been proposed to replace the yoke portion with a spring steel band which wraps around the side beams from behind and is attached only on the outside thereof. In such a construction, under a heavy load from the front of the back rest, as can occur, for example, in an accident, the side beams are only subjected to a bending load, and not a torsional load. It is, therefore, sufficient to make the side beams adequately stiff to handle the occurring bending loads. This arrangement is possible and results in a significantly lower expense, lower weight and less required space in comparison to such side beams which experience a torsion and must also have their full load-carrying capacity even in their twisted condition. This advantage is accompanied by a disadvantage, however, which leads to problems, especially when the seat is built into a vehicle in which relatively little room is available in the longitudinal direction of the seat. Under a load on the back rest from the front, the spring steel band can bend so far backward, under given conditions, that a person located behind this back rest can be endangered or even injured thereby. If the support bars of a head rest are attached to the spring steel band, then during a bending out of the band, these support bars or their mounts in the head rest can be deformed. A further disadvantage is that the side beams draw closer together during a bending of the spring steel band, which can result in a lateral pressure being exerted on the seat user.

SUMMARY AND OBJECTS OF THE INVENTION

The object of the invention is to create a back rest of the above-described type, in which not only the side beams themselves experience no torsion or draw closer together under a strong load on the back rest from the front, but also the yoke portion experiences at least no appreciable curvature toward the rear and the back rest is therefore suitable even for vehicles having limited available space in the longitudinal direction of the seat. This object is achieved with a back rest of the present invention.

The bending resistant and kink resistant spacer prevents the side beams from drawing closer together under a heavy load on the back rest from the front and avoids a torsional load on the side beams, since the spacer abuts the side beams without a rigid connection. A torsional load can also not be exerted on the side beams by the lateral element. The side beams therefore only need to absorb a bending load in the pivoting direction of the back rest. With the solution according to the invention, a bending of the back rest toward the rear under a load from the front is at least largely suppressed, because the spacer is resistant to bending and kinking, i.e., does not flex backward, and the lateral element is prevented from an appreciable backward flexing in that the side beams maintain their distance from each other due to the yoke portion serving as a spacer and the absent torsional load. Also advantageous is the fact that the loading of the back rest from the front or back does not lead to a load on the head rest when the spacer serves as a support for a head rest.

Preferably, the spacer is formed according to the invention so that it can then serve simultaneously as a support for a head rest and/or a shoulder support.

The lateral element could be a stirrup-like shapemaintaining body, but is preferably a flexible piece of sheet metal, in view of weight and costs, because it can also fulfill the purposes of the lateral element and is even more advantageous than a shape-maintaining body to the extent that its end sections can adjust to the angle necessary for the torsion free loading of the side beams. Accordingly, the zones in which the sheet metal experiences a deflection through the end sections of the spacer and the side beams form areas that act like hinges.

Because no rigid connection is present between the lateral element and the side beams and the side beams are simply supported on the spacer, the spacer can be made of plastic. This is also advantageous in that the mounts necessary for a head rest and/or a shoulder support or even for the activation of a release device can be formed thereon and thereby not cause any additional expense.

In order to be able to provide for a simple transfer of the forces acting downward on the spacer onto the side beams, in a preferred embodiment, the spacer lies on the upper edge of the sheet metal forming the lateral element. In this direction, this sheet metal, which is spotwelded, for example, to the side beams, has a high load-carrying capacity. A fixing of the position of the spacer with respect to the sheet metal is possible, for example, with the means mentioned hereinafter.

In a preferred embodiment, the side beams and the spacer are formed and arranged according to the invention. By this means, a reliable positioning of the spacer is obtained in an especially simple manner with a shaped body that is advantageous both from the manufacturing perspective and from that of weight. The embodiments according to the invention also contribute in this regard.

The flexible sheet metal which forms the lateral element can extend over beyond the lower edge of the spacer and, together with the side beams, it can form a shell-like upholstery support.

BRIEF DESCRIPTION OF THE DRAWINGS

The invention is described in greater detail below with the aid of an exemplary embodiment illustrated in the drawings.

FIG. 5 is a section according to the line V—V in FIG. 2; and

FIG. 6 is a section according to the line VI—VI in FIG. 2.

DETAILED DESCRIPTION OF THE PREFERRED EMBODIMENTS

Figure 3:
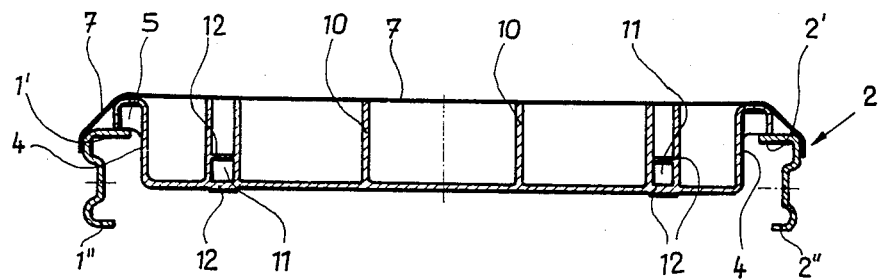
FIG. 3 is a section according to the line III—III in FIG. 2.
Figure 4:
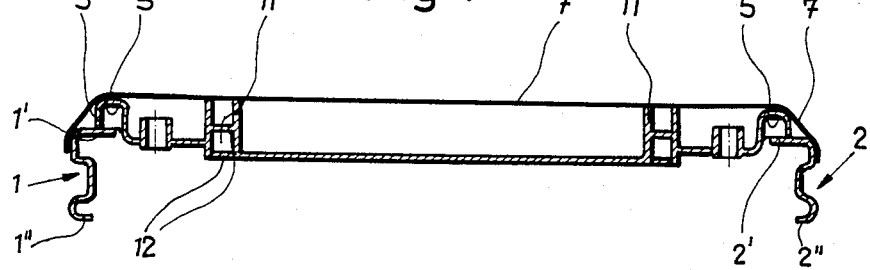
FIG. 4 is a section according to the line IV—IV in FIG. 2.

A back rest for a motor vehicle seat includes two side beams 1 and 2, which are formed as mirror images of each other relative to the center of the back rest. These side beams 1 and 2 are connected in the vicinity of their lower ends with the upholstery support of the associated seat element by means of a schematically illustrated known hinge fitting in such a manner as to be pivotable and capable of being fixed in a selectable pivot position. The steel sheet side beams 1 and 2 have a C-shaped cross section, as shown in FIGS. 3 and 4, whereby the two shanks 1' and 1" and 2' and 2" run parallel to each other and are directed toward the other side beam. The yoke portion of the shaped beam, which is relatively wide in relation to the length of the shanks, is stiffened by an inwardly pressed, wide reinforcing crease or groove. The side beams 1 and 2 therefore have a high stiffness (resistance to bending) in their pivot direction and a limited stiffness relative to a bending toward the other side beam.

Figure 2:
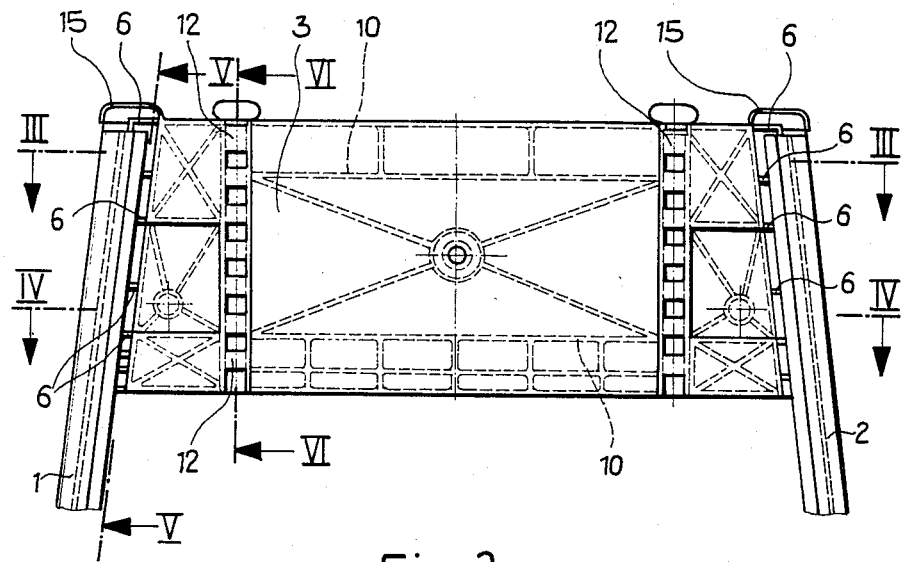
FIG. 2 is a partial view from the front of the embodiment without upholstery.

As shown in FIG. 2, a bending and kinking resistant spacer 3 is arranged between the two side beams 1 and 2, whose distance from each other decreases toward their upper ends, at a point near these upper ends. This spacer 3 is inserted between the side beams 1 and 2 from behind and is a plastic injection molded element. The angle of the side surfaces 4 of the spacer 3 is adapted to the angle of the side beams 1 and 2. The spacer 3 can therefore not be moved upward out of its position between the side beams 1 and 2, even though it is not connected with the side beams 1 and 2 by means of screws or other connecting elements.

Respective fillets 5 formed in one piece with the spacer 3 project over the two side surfaces 4. These fillets 5 are open toward the front for manufacturing reasons and are stiffened by cross members 6. These fillets 5, which are identical mirror images and whose rear limiting wall 5' lies in the surface defined by the rear limiting wall of the spacer 3, become thinner toward their lower end. The height of the side wall 5" therefore decreases toward the bottom, as shown in FIG. 5.

The forwardly directed surface of the side wall 5" of the fillets 5 lies against the rearwardly directed side of the rear shank 1' and 2' of the two side beams 1 and 2. To the extend that these two shanks 1' and 2' project into the area of the cross members 6, these cross members 6 also abut the shanks 1' and 2'. The spacer 3, including the fillets 5, thus projects over the side beams 1 and 2 toward the rear, namely, in accordance with the thickness of the fillets 5. As shown particularly in FIGS. 3 and 4, a thin, flexible piece of sheet metal 7, which in the exemplary embodiment has a thickness of about 0.4 mm, lies against the back side of the spacer 3. The piece of sheet metal 7 is guided over and past the fillets 5 to the side beams 1 and 2. The rearward projection of the fillets 5 over the side beams 1 and 2 and the distance by which the fillets 5 are displaced toward the center of the back rest relative to the side beams 1 and 2, i.e., their distance from each other is smaller than the distance of the side beams 1 and 2 from each other, are selected such that the two sections of the sheet metal 7 extending from the fillets 5 to the adjacent side beam 1 or 2 form an acute angle with the longitudinal center plane of the back rest, which angle has the size necessary for a torsionfree loading of the side beams 1 and 2. The zones of the sheet metal 7 which experience a deflection by the fillets 5 and the side beams 1 and 2 thus form hinge-like areas which make possible an adjustment of the sheet metal 7 to the correct angle.

The sheet metal 7 lies against the side beams 1 and 2, namely on its edge at the transition from the yoke section by spot welding or in another manner in the area between this shank and the reinforcing crease. By this means, in conjunction with the downward tapering of the fillets 5, the spacer 3 wedges itself between the side beams and the sheet metal 7 during a downward movement relative to the two side beams 1 and 2. Above all, however, this design has the effect that, even under heavy loads on the back rest from the front, the side beams 1 and 2 are not subjected to any torsional loading but only to a bending load, whereby the spacer 3 prevents the distance between the two side beams 1 and 2 from decreasing, i.e., from bending toward each other. In this manner, the sheet metal 7, even under a heavy load from the front, does not appreciably bend toward the rear.

Figure 1:
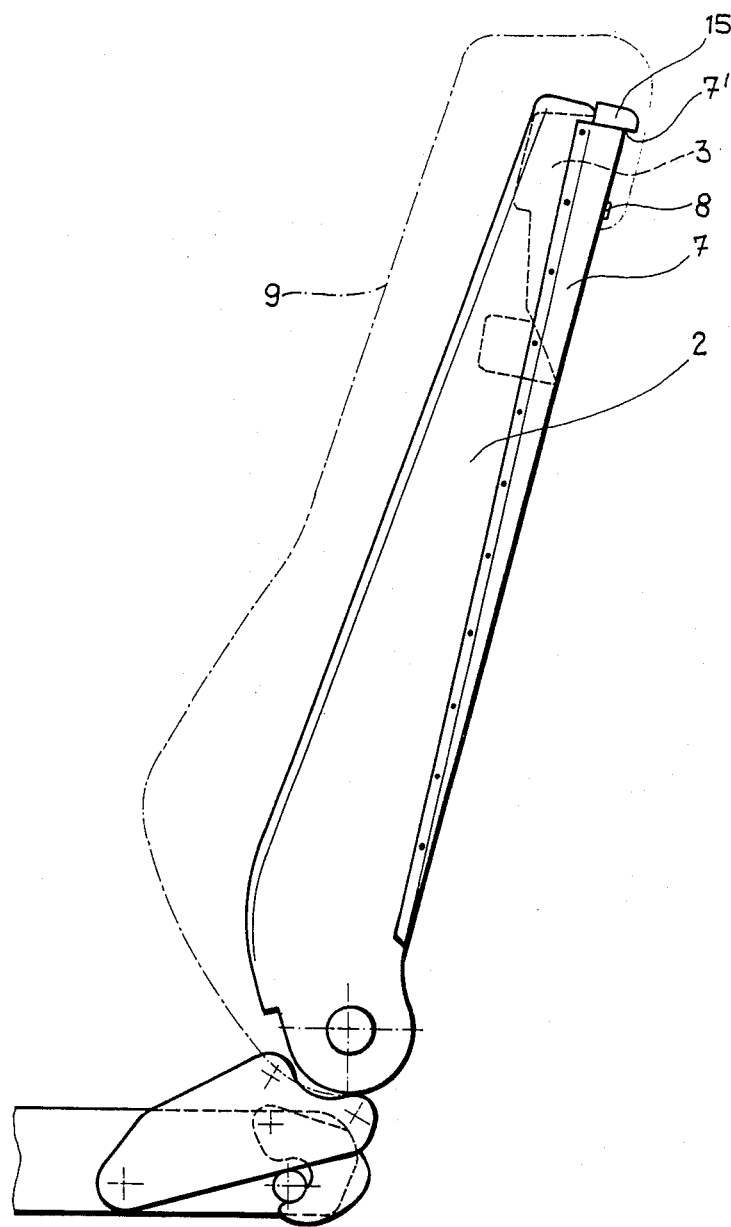
FIG. 1 is a side view of the exemplary embodiment.

As shown in FIG. 1, a step 7', which projects rearwardly and extends over the entire width, is provided on the back side of the spacer 3 near its upper edge. This step 7' lies on the upper edge of the sheet metal 7. The spacer 3 therefore supports itself on the sheet metal 7 under a load from above. In addition, screws 8, which penetrate the sheet metal 7 are screwed into the spacer 3, assure the spacer 3 against a backward shifting. In addition, the screws 8 hold the sheet metal 7 in contact with the back side of the spacer 3. It would also be possible, however, to angle the upper edge of the sheet metal 7 toward the front in the vicinity of the spacer 3 and to allow these forwardly projecting edge strips to engage in the spacer 3. Another possibility would be to provide a groove in the step 7' which overlaps the upper edge of the sheet metal 7, which groove would receive the upper edge. In both instances, in addition to the contact against the back side of the spacer 3 by the tension of the sheet metal 7, it would also be assured that the upper edge of the sheet metal 7 is always covered by the spacer 3, even when the step 7' is provided on the spacer 3 is very narrow, which narrowness is desired for safety reasons.

A cap 15 is formed on the upper ends of both fillets 5, which caps 15 cover the upper ends of the side beams 1 and 2, so that the side beams 1 and 2 can be open upward.

The sheet metal 7 extends downward into the vicinity of that area of the side beams 1 and 2 in which the side beams 1 and 2 support the hinge fitting. In this manner, the sheet metal 7, together with the side beams 1 and 2 and the spacer 3, forms a shell-like upholstery support for the upholstery 9 illustrated in FIG. 1 with a broken line. Of course, if the upholstery 9 is pulled forward in the lower back and hip area, as shown in FIG. 1, respective side cheek frames or the like can be attached to the side beams 1 and 2.

The spacer 3 includes not only stiffening ribs 10 shown in FIGS. 2 and 3, for stiffening the essentially rectangular front side which faces the back of the seat user, but also, as shown particularly in FIGS. 3 and 4, the spacer 3 is provided with two parallel, vertical guide channels 11 running the full length thereof, in which the support bars of a head rest can be inserted. The guide channels 11 have a square cross section, whereby the side length is selected to be equal to the diameter of the usually round support bars, so that these support bars lie in the guide channels 11 with practically no play. As shown in FIG. 6, toward the front and back, the guide channels 11 are limited by cross members 12, which lie in the longitudinal channel direction at intervals equal to the cross member width. The cross members 12 arranged thusly on the front side are aligned with the holes between the cross members 12 on the back side and vice versa. This embodiment of the guide channels 11 results in the support bars being able to have relatively large tolerances. The setting of the support bars at the desired height takes place in a known manner by means of respective shank springs, which can engage in the detents in the support bars and which lie on the upper side of the spacer 3.

Instead of the guide channels 11, the spacer 3 could have a mount for a shoulder support, in which corresponding guide channels 11 for the support bars of a head rest could then be provided. In addition, the activating elements necessary in a back rest which can be folded forward to release the locking mechanism that prevents such a folding can be provided in the spacer 3.

These embodiments of the present invention are considered to be illustrative only since other modifications will be readily discerned by those skilled in the pertinent art. In any event, the scope of the invention is intended to be covered by both the letter and the spirit of the claims appended hereto.

We claim:

1. A back rest for a vehicle seat, particularly for a motor vehicle seat, comprising:
   side beams formed as shaped rails;
   a yoke portion extending from one side beam to another side beam in the vicinity of upper ends of the side beams and being formed as a bending and kinking resistant spacer which abuts the side beams but is unconnected thereto, said spacer extending rearwardly beyond the side beams at least in the area of its end sections which abut the side beams; and
   a lateral element engaging the side beams from the rear and being attached to outer sides of the side beams, said lateral element also abutting a back side of the spacer.

2. The back rest according to claim 1, characterized in that the spacer is arranged at the height of the upper ends of the side beams and further in that the spacer also includes means for mounting one of a head rest and a shoulder support.

3. The back rest according to claim 1, characterized in that the spacer is made of plastic.

4. The back rest according to claim 1, characterized in that the distance of the end sections of the spacer from each other is smaller than the distance of the side beams from each other.

5. The back rest according to claim 1, characterized in that the side beams, at least in an area in which the spacer is located, are spaced from each other at a distance which decreases toward the upper ends of the side beams.

6. The back rest according to claim 1, characterized in that the lateral element extends in the longitudinal direction of the side beams beyond a lower edge of the spacer into an area of lower end sections of the side beams.

7. The back rest according to claim 1, characterized in that the lateral element is a flexible piece of sheet metal whose forwardly bent edge zones are attached to the outer sides of the side beams and define angles with a longitudinal center plane of the vehicle seat, said angles being in part also determined by the end sections of the spacer, which end sections overlap a back side of the side beams.

8. The back rest according to claim 5, characterized in that the angles are established by the overlap of the end sections of the spacer and by the displacement of the end sections of the spacer toward the center of the back rest relative to the side beams.

9. The back rest according to claim 5, characterized in that the spacer lies on the upper edge of the flexible piece of sheet metal.

10. The back rest according to claim 5, characterized in that the spacer is connected with the flexible piece of sheet metal by connecting elements which penetrate therethrough.

11. The back rest according to claim 1, characterized in that at least one of the side beams has a C-shaped crosssection and also has shanks which are directed toward another side beam, and further in that the spacer is provided with projections at its end sections which abut the side beams, said projections abutting on one side of the lateral element and abutting on another side the outside of the shanks of at least one of the side beams which face the lateral element.

12. The back rest according to claim 11, characterized in that at least two projections of the spacer taper downwardly in a form of a wedge in the longitudinal direction of the side beams.

* * * * *